US007222048B2

(12) United States Patent
Petchenev et al.

(10) Patent No.: US 7,222,048 B2
(45) Date of Patent: May 22, 2007

(54) METHODS AND SYSTEMS FOR DIAGNOSING MACHINERY

(75) Inventors: Alexei Petchenev, Minden, NV (US); Nathan Bowman Littrell, Gardnerville, NV (US); Olga Malakhova, Carson City, NV (US); John Wesley Grant, Gardnerville, NV (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/111,199

(22) Filed: Apr. 21, 2005

(65) Prior Publication Data
US 2006/0241910 A1    Oct. 26, 2006

(51) Int. Cl.
*G21C 17/00* (2006.01)
*G06F 11/00* (2006.01)

(52) U.S. Cl. ..................................... 702/182
(58) Field of Classification Search .................. 702/182
See application file for complete search history.

(56) References Cited

U.S. PATENT DOCUMENTS

| 4,122,621 | A | 10/1978 | Barr |
| 5,210,704 | A * | 5/1993 | Husseiny ..................... 702/34 |
| 6,003,808 | A | 12/1999 | Nguyen et al. |
| 6,405,108 | B1 | 6/2002 | Patel et al. |
| 6,463,380 | B1 | 10/2002 | Ablett et al. |
| 6,622,264 | B1 | 9/2003 | Bliley et al. |
| 6,643,801 | B1 | 11/2003 | Jammu et al. |
| 6,694,285 | B1 | 2/2004 | Choe et al. |
| 6,711,952 | B2 | 3/2004 | Leamy et al. |
| 6,728,660 | B2 | 4/2004 | Bjornson |
| 6,745,153 | B2 | 6/2004 | White et al. |
| 6,799,154 | B1 | 9/2004 | Aragones et al. |
| 6,801,877 | B2 | 10/2004 | Schiltz et al. |
| 6,865,513 | B2 | 3/2005 | Ushiku et al. |
| 2003/0216888 | A1 | 11/2003 | Ridolfo |
| 2004/0122621 | A1* | 6/2004 | Vezzu et al. ................. 702/182 |
| 2004/0148129 | A1 | 7/2004 | Gotoh et al. |

OTHER PUBLICATIONS

European Search Report, App. No. EP06252145 (Sep. 26, 2006).

* cited by examiner

*Primary Examiner*—Michael Nghiem
*Assistant Examiner*—Cindy D. Khuu
(74) *Attorney, Agent, or Firm*—Armstrong Teasdale LLP

(57) ABSTRACT

A method of predicting the remaining operational life of a component including generating a plurality of component data utilizing a machinery monitoring system including a database having at least one rule set, the component data indicative of a least one operational parameter of the component, trending the component data utilizing the rule set, and extrapolating the trended data to facilitate predicting the remaining operational life of the component.

19 Claims, 4 Drawing Sheets

METHODS AND SYSTEMS FOR DIAGNOSING MACHINERY

BACKGROUND OF THE INVENTION

This invention relates generally to the monitoring of machinery, and more particularly to methods and systems for mathematically estimating an equipment failure.

At least some known machinery monitoring systems, monitor machine drivers, for example, motors and turbines, or machine driven components, such as, pumps, compressors, and fans. Other known monitoring systems monitor process parameters of a process, for example, piping systems, and machine environmental conditions, such as machine vibration, machine temperature, and machine oil condition. Typically, such monitoring systems are supplied by an original equipment manufacture (OEM) that is responsible for only a portion of a facility, for example, a specific piece of equipment, and as such, the OEM only provides monitoring for equipment provided by that OEM. However, industrial facilities such as power plants, refineries, factories, and commercial facilities, such as, hospitals, high-rise buildings, resorts, and amusement parks utilize a considerable plurality of machine drivers and driven equipment dependently interconnected to form various process systems. An architect/engineer integrates such equipment for an owner or operator of the facility. Monitoring systems supplied by different OEMs communicate with external data collection and control systems, such as distributed control systems (DCS) located at sites that are remote from the monitored equipment, for example, control rooms and/or operating areas.

Typically, machine monitoring systems are primarily focused on providing operating indications and controls, trending, and/or datalogging capabilities for future reconstruction of abnormal events. However, known monitoring systems do not analyze the data to estimate when a machinery failure may occur. For example, monitoring systems collect electrical data from a motor, however, the operator must interpret the data to determine if and/or when the motor may reach a critical condition, i.e., when the machine may fail. More specifically, during operation, the operator visually analyzes the trended data to determine if the machine is trending towards a dangerous level. The operator then visually approximates when the machine will reach the dangerous level. For example, the operator may hold a ruler to a display of the trend to visualize at what point of time in the future, the machine may fail during operation.

Accordingly, estimating a time when a machine may fail, is generally determined by an operator based on the operator's visual analysis of the trending data. Thus predicting a time when a machine may fail, varies based on each specific operator's visual interpretation of the trending data.

BRIEF DESCRIPTION OF THE INVENTION

In one aspect, a method of predicting the remaining operational life of a component is provided. The method includes generating a plurality of component data utilizing a machinery monitoring system including a database having at least one rule set, the component data indicative of at least one operational parameter of the component, trending the component data utilizing the rule set, and extrapolating the trended data to facilitate predicting the remaining operational life of the component.

In another aspect, a computer program for predicting the remaining operational life of a component is provided. The computer program is configured to generate a plurality of component data samples utilizing a machinery monitoring system including a database having at least one rule set, the component data samples indicative of at least one operational parameter of the component, trend the component data samples utilizing the rule set, and extrapolate the trended data to facilitate predicting the remaining operational life of the component.

DETAILED DESCRIPTION OF THE INVENTION

Figure 1:
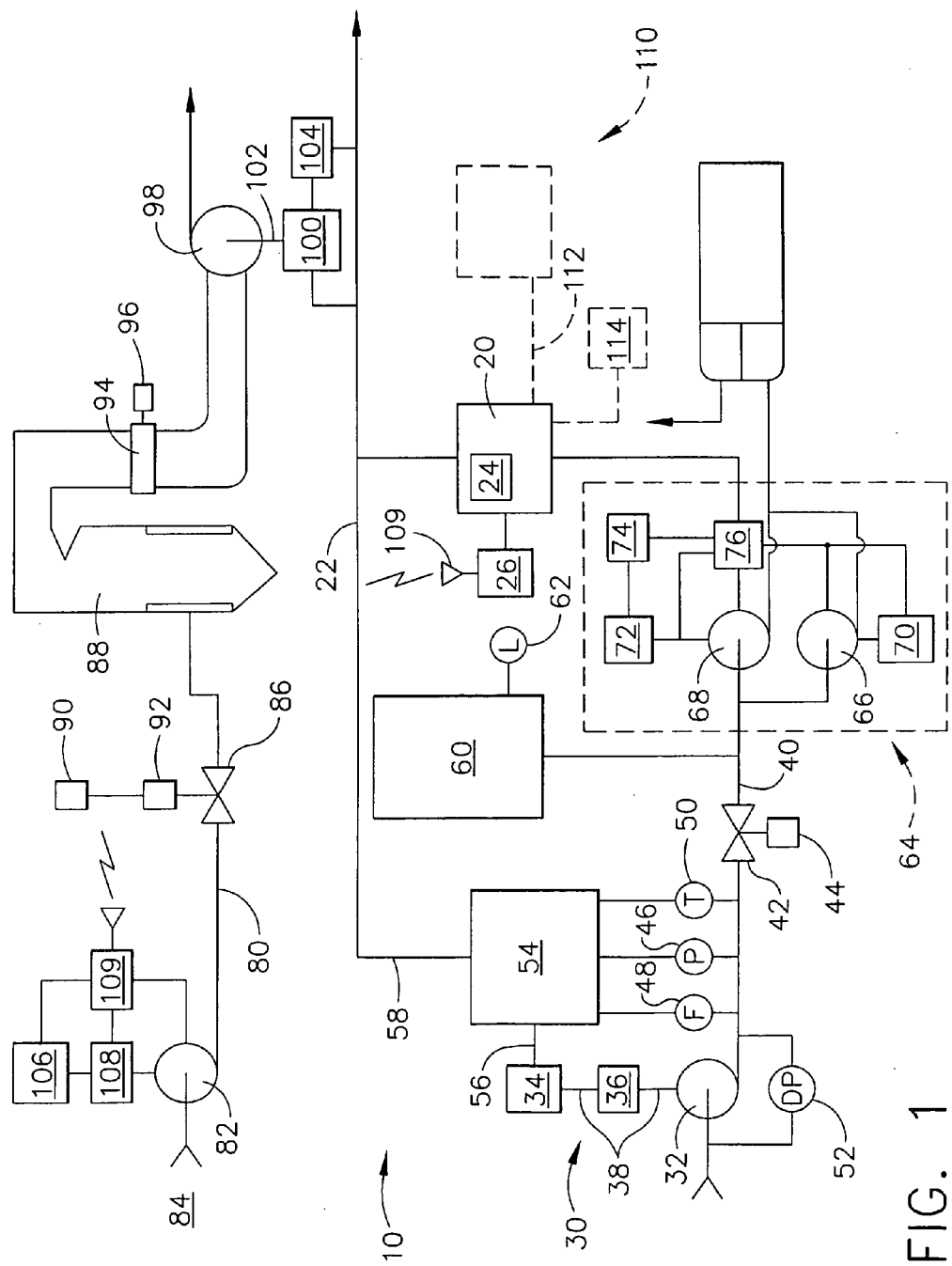
FIG. 1 is a block diagram an exemplary equipment layout of an industrial plant.

FIG. 1 is a block diagram an exemplary equipment layout of an industrial plant 10. Industrial plant 10 may include a plurality of pumps, motors, fans, and process monitoring sensors that are coupled in flow communication through interconnecting piping and coupled in signal communication with a control system through one or more remote input/output (I/O) modules and interconnecting cabling and/or wireless communication. In the exemplary embodiment, industrial plant 10 includes a distributed control system (DCS) 20 including a network backbone 22. Network backbone 22 may be a hardwired data communication path fabricated from twisted pair cable, shielded coaxial cable or fiber optic cable, for example, or may be at least partially wireless. DCS 20 may also include a processor 24 that is communicatively coupled to equipment that is located at industrial plant 10, or at remote locations, through network backbone 22. It is to be understood that any number of machines may be communicatively connected to the network backbone 22. A portion of the machines may be hardwired to network backbone 22, and another portion of the machines may be wirelessly coupled to backbone 22 via a base station 26 that is communicatively coupled to DCS 20. Wireless base station 26 may be used to expand the effective communication range of DCS 20, such as with equipment or sensors located remotely from industrial plant 10 but, still interconnected to one or more systems within industrial plant 10.

DCS 20 may be configured to receive and display operational parameters associated with a plurality of equipment, and to generate automatic control signals and receive manual control inputs for controlling the operation of the equipment of industrial plant 10. In the exemplary embodiment, DCS 20 may include a software code segment configured to control processor 24 to analyze data received at DSC 20 that allows for on-line monitoring and diagnosis of the industrial plant machines. Process parameter data may be collected from each machine, including pumps and motors, associated process sensors, and local environmental sensors, including for example, vibration, seismic, ambient temperature and ambient humidity sensors. The data may be pre-processed by a local diagnostic module or a remote input/output module, or may transmitted to DCS 20 in raw form.

Specifically, industrial plant 10 may include a first process system 30 that includes a pump 32 coupled to a motor 34 through a coupling 36, for example a hydraulic coupling, and interconnecting shafts 38. The combination of pump 32, motor 34, and coupling 36, although comprising separate components, may operate as a single system, such that conditions affecting the operation of one component of the combination may effect each of the other components of the combination. Accordingly, condition monitoring data collected from one component of the combination that indicates a failure of a portion of the component or an impending failure of the component may be sensed at the other components of the combination to confirm the failure of the component and/or facilitate determining a source or root cause of the failure.

Pump 32 may be connected to a piping system 40 through one or more valves 42. Valve 42 may include an actuator 44, for example, but, not limited to, an air operator, a motor operator, and a solenoid. Actuator 44 may be communicatively coupled to DCS 20 for remote actuation and position indication. In the exemplary embodiment, piping system 40 may include process parameter sensors, such as a pressure sensor 46, a flow sensor 48, a temperature sensor 50, and a differential pressure (DP) sensor 52. In an alternative embodiment, piping system 40 may include other sensors, such as turbidity, salinity, pH, specific gravity, and other sensors associated with a particular fluid being carried by piping system 40. Sensors 46, 48, 50 and 52 may be communicatively coupled to a field module 54, for example, a preprocessing module, or remote I/O rack.

Motor 34 may include one or more of a plurality of sensors (not shown) that are available to monitor the operating condition of electrodynamic machines. Such sensors may be communicatively coupled to field module 54 through an interconnecting conduit 56, for example, copper wire or cable, fiber cable, and wireless technology.

Field module 54 may communicate with DCS 20 through a network segment 58. The communications may be through any network protocol and may be representative of preprocessed data and or raw data. The data may be transmitted to processor 24 continuously in a real-time environment or to processor 24 intermittently based on an automatic arrangement or a request for data from processor 24. DCS 20 includes a real time clock in communication with network backbone 22, for time stamping process variables for time-based comparisons.

Piping system 40 may include other process components, such as a tank 60 that may include one or more of a plurality of sensors available for monitoring process parameters associated with tanks, such as, a tank level sensor 62. Tank 60 may provide a surge volume for fluid pumped by pump 32 and/or may provide suction pressure for downstream components, such as, skid 64. Skid 64 may be a pre-engineered and prepackaged subsystem of components that may be supplied by an OEM. Skid 64 may include a first pump 66 and a second pump 68. In the exemplary embodiment, first pump is coupled to a motor that is directly coupled to a power source (not shown) through a circuit breaker (not shown) that may be controlled by DCS 20. Second pump 68 is coupled to a motor 72 that is coupled to the power source through a variable speed drive (VSD) 74 that controls a rotational speed of motor 72 in response to commands from a skid controller 76. Each of pumps 66 and 68, and motors 70 and 72, and VSD 74 may include one or more sensors associated with respective operating parameters of each type of equipment as described above in relation to pump/motor/coupling 32, 34, and 36 combination. Skid controller 76 receives signals from the sensors and may transmit the signals to DCS 20 without preprocessing or after processing the data in accordance with predetermined algorithms residing within skid controller 76. Skid controller 76 may also process the signals and generate control signals for one or more of pumps 66 and 68, and motors 70 and 72, and VSD 74 without transmitting data to DCS 20. Skid controller may also receive commands from DCS 20 to modify the operation of skid 64 in accordance therewith.

A second piping system 80 may include a fan 82 that receives air from an ambient space 84 and directs the air through a valve or damper 86 to a component, such as a furnace 88. Damper 86 may include position sensors 90 and 92 to detect an open and closed position of damper 86. Furnace 88 may include a damper 94 that may be operated by actuator 96, which may be, for example, a motor actuator, a fluid powered piston actuator, or other actuator, which may be controlled remotely by DCS 20 through a signal transmitted through a conduit (not shown). A second fan 98 may take a suction on furnace 88 to remove combustion gases from furnace 88 and direct the combustion gases to a smoke stack or chimney (not shown) for discharge to ambient space 84. Fan 98 may be driven by a motor 100 through a shaft 102 coupled between fan 98 and motor 100. A rotational speed of motor 100 may be controlled by a VSD 104 that may be communicatively coupled to DCS 20 though network backbone 22. Fan 82 may be driven by an engine 106, such as an internal combustion engine, or a steam, water, wind, or gas turbine, or other driver, through a coupling 108, which may be hydraulic or other power conversion device. Each of the components may include various sensors and control mechanisms that may be communicatively coupled to DCS 20 through network backbone 22 or may communicate with DCS 20 through a wireless transmitter/receiver 109 to wireless base station 26.

DCS 20 may operate independently to control industrial plant 10, or may be communicatively coupled to one or more other control systems 110. Each control system may communicate with each other and DCS 20 through a network segment 112, or may communicate through a network topology, for example, a star (not shown).

In the exemplary embodiment, plant 10 includes a continuous integrated machinery monitoring system (CIMMS) 114 that communicates with DCS 20 and other control systems 110. CIMMS 114 may also be embodied in a software program segment executing on DCS 20 and/or one or more of the other control systems 110. Accordingly, CIMMS 114 may operate in a distributed manner, such that a portion of the software program segment executes on several processors concurrently. As such, CIMMS 114 may be fully integrated into the operation of DCS 20 and other control systems 110. CIMMS 114 analyzes data received by DCS 20 and the other control systems 110 determine a health the machines and/or a process employing the machines using a global view of the industrial plant 10. CIMMS 114 analyzes combinations of drivers and driven components, and process parameters associated with each combination to correlate machine health findings of one machine to machine health indications from other machines in the combination, and associated process or environmental data. CIMMS 114 uses direct measurements from various sensors available on each machine and derived quantities from all or a portion of all the sensors in industrial plant 10. CIMMS 114, using predetermined analysis rules, determines a failure or impending failure of one machine and automatically, in real-time correlates the data used to determine the failure or impending failure with equivalent data derived from the operating parameters of other components in the combination or from process parameters. CIMMS 114 also provides for performing trend analysis on the machine combinations and displaying data and/or trends in a variety of formats so as to afford a user of CIMMS 114 an ability to quickly interpret the health assessment and trend information provided by CIMMS 114.

Figure 2:
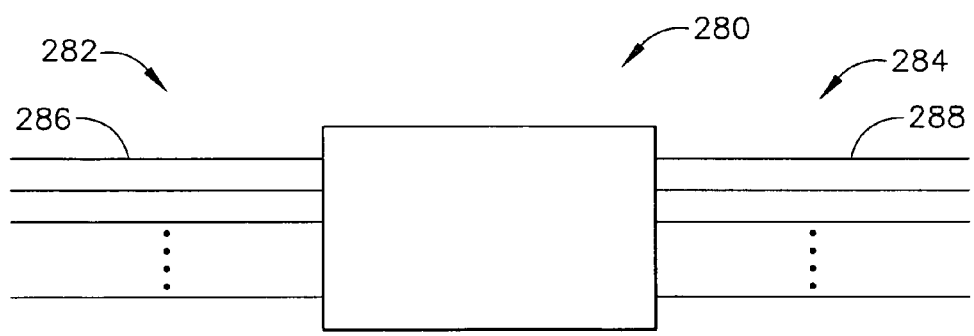
FIG. 2 is a block diagram of an exemplary rule set that may be used with the continuous integrated machinery monitoring system (CIMMS) shown in FIG. 1.

FIG. 2 is a block diagram of an exemplary rule set 280 that may be used with CIMMS 114 (shown in FIG. 1). Rule set 280 may be a combination of one or more custom rules, and a series of properties that define the behavior and state of the custom rules. The rules and properties may be bundled and stored in a format of an XML string, which may be encrypted based on a 25 character alphanumeric key when stored to a file. Rule set 280 is a modular knowledge cell that includes one or more inputs 282 and one or more outputs 284. Inputs 282 may be software ports that direct data from specific locations in CIMMS 114 to rule set 280. For example, an input from a motor current sensor may be transmitted to a hardware input termination in DCS 20. DCS 20 may sample the signal at that termination to receive the signal thereon. The signal may then be processed and stored at a location in a memory accessible and/or integral to DCS 20. A first input 286 of rule set 280 may be mapped to the location in memory such that the contents of the location in memory is available to rule set 280 as an input. Similarly, an output 288 may be mapped to another location in the memory accessible to DCS 20 or to another memory such that the location in memory contains the output 288 of rule set 280.

In the exemplary embodiment, rule set 280 includes one or more rules relating to monitoring and diagnosis of specific problems associated with equipment operating in an industrial plant, such as, for example, a power plant, a refinery, and a chemical processing facility. Although rule set 280 is described in terms of being used with an industrial plant, rule set 280 may be appropriately constructed to capture any knowledge and be used for determining solutions in any field. For example, rule set 280 may contain knowledge pertaining to economic behavior, financial activity, weather phenomenon, design processes, and medical conditions. Rule set 280 may then be used to determine solutions to problems in these fields. Rule set 280 includes knowledge from one or many sources, such that the knowledge is transmitted to any system where rule set 280 is applied. Knowledge is captured in the form of rules that relate outputs 284 to inputs 282 such that a specification of inputs 282 and outputs 284 allows rule set 280 to be applied to CIMMS 114. Rule set 280 may include only rules specific to a specific plant asset and may be directed to only one possible problem associated with that specific plant asset. For example, rule set 280 may include only rules that are applicable to a motor or a motor/pump combination. Rule set 280 may only include rules that determine a health of the motor/pump combination using vibration data. Rule set 280 may also include rules that determine the health of the motor/pump combination using a suite of diagnostic tools that include, in addition to vibration analysis techniques, but may also include, for example, performance calculational tools and/or financial calculational tools for the motor/pump combination.

In operation, rule set 280 is created in a software developmental tool that prompts a user for relationships between inputs 282 and outputs 284. Inputs 282 may receive data representing, for example digital signals, analog signals, waveforms, manually entered and/or configuration parameters, and outputs from other rule sets. Rules within rule set 280 may include logical rules, numerical algorithms, application of waveform and signal processing techniques, expert system and artificial intelligence algorithms, statistical tools, and any other expression that may relate outputs 284 to inputs 282. Outputs 284 may be mapped to respective locations in the memory that are reserved and configured to receive each output 284. CIMMS 114 and DCS 20 may then use the locations in memory to accomplish any monitoring and/or control functions CIMMS 114 and DCS 20 may be programmed to perform. The rules of rule set 280 operate independently of CIMMS 114 and DCS 20, although inputs 282 may be supplied to rule set 280 and outputs 284 may be supplied to rule set 280, directly or indirectly through intervening devices.

Figure 3:
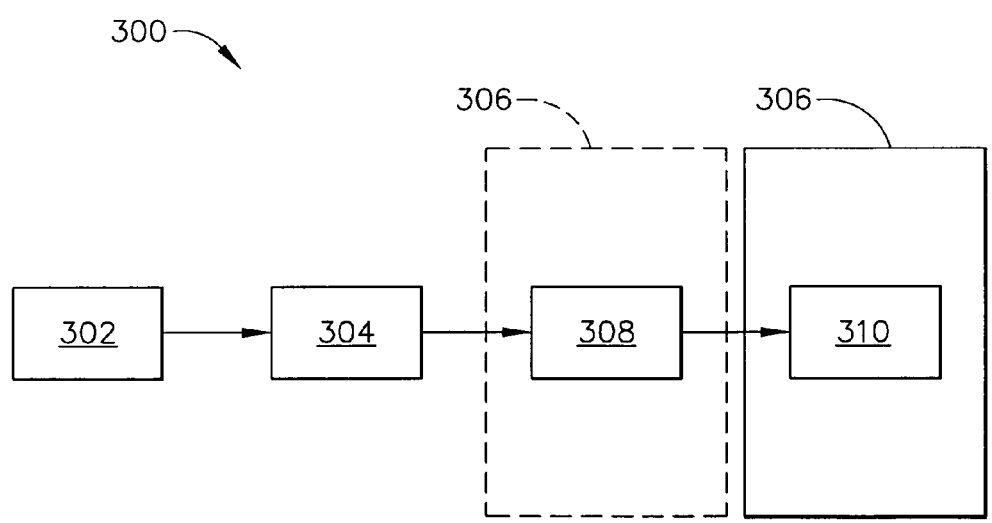
FIG. 3 illustrates an exemplary flow diagram of a life cycle of the rule set shown in FIG. 2.

FIG. 3 illustrates an exemplary flow diagram 300 of a life cycle of rule set 280 (shown in FIG. 2). During creation of rule set 280, in a developmental mode 302, a human expert in the field wherein rule set 280 is created, divulges knowledge of the field particular to a specific asset using the development tool by authoring one or more rules. The rules are created by creating expressions of relationship between outputs 284 and inputs 282 such that no coding of the rules is needed. Operands may be selected from a library of operands, using graphical methods, for example, using drag and drop on a graphical user interface built into the development tool. A graphical representation of an operand may be selected from a library portion of a screen display (not shown) and dragged and dropped into a rule creation portion. Relationships between input 282 and operands are arranged in a logical display fashion and the user is prompted for values, such as, constants, when appropriate based on specific operands and specific ones of inputs 282 that are selected. As many rules that are needed to capture the knowledge of the expert are created. Accordingly, rule set 280 may include a robust set of diagnostic and/or monitoring rules or a relatively less robust set of diagnostic and/or monitoring rules based on a customers requirements and a state of the art in the particular field of rule set 280. The development tool provides resources for testing rule set 280 during a test mode 304 of the development to ensure various combinations and values of inputs 282 produce expected outputs at outputs 284. To protect the knowledge or intellectual property captured in rule set 280, a developmental encryption code may be used to lock rule set 280 from being altered except by those in possession of the encryption key. For example, the creator of rule set 280 may keep the encryption key to lockout end users of rule set 280, the creator may sell the encryption key or license it for a period of time, to the end user or third parties, who may then provides services to the end user.

After development, rule set 280 may enter a distribution mode wherein rule set 280 is converted to a transmittable form, for example, a XML file that may be transmitted to a customer via e-mail, CD-ROM, link to an Internet site, or any other means for transmission of a computer readable file. Rule set 280 may be encrypted with a distribution encryption code that may prevent the use of rule set 280 unless the end user is authorized by the creator, for example, by purchasing a distribution encryption key. Rule set 280 may be received by an end user through any means by which a computer readable file may be transmitted. A rule set manager 306, which may be a software platform that forms a portion of CIMMS 114, may receive the distributable form of rule set 280 and convert it to a format usable by CIMMS 114. Rule set manger 306 may be a graphical user interface that allows an end user to manipulate one or more rule sets 280 as objects. Rule set manager 306 may be used to apply rule set 280 such that inputs 282 and corresponding locations in memory are mapped correctly and outputs 284 and their corresponding locations in memory are mapped correctly. When initially applied, rule set 280 may be placed into a trial mode 308 wherein rule set 280 operates as created except that notifications of anomalous behavior may be detected by rule set 280 are not distributed or distributed on a limited basis. During trial mode 308, quality certifications may be performed to ensure rule set 280 operates correctly in an operating environment. When quality certification is complete, rule set 280 may be placed into a commission mode 310 wherein rule set 280 operates on CIMMS 114 with full functionality of the rules within rule set 280. In another embodiment, rule set 280 includes a life cycle with only two modes, a trial mode and a live mode. In the trial mode, rules run normally except there are no events generated nor notifications sent, and the live mode is substantially similar to commission mode 310.

Figure 4:
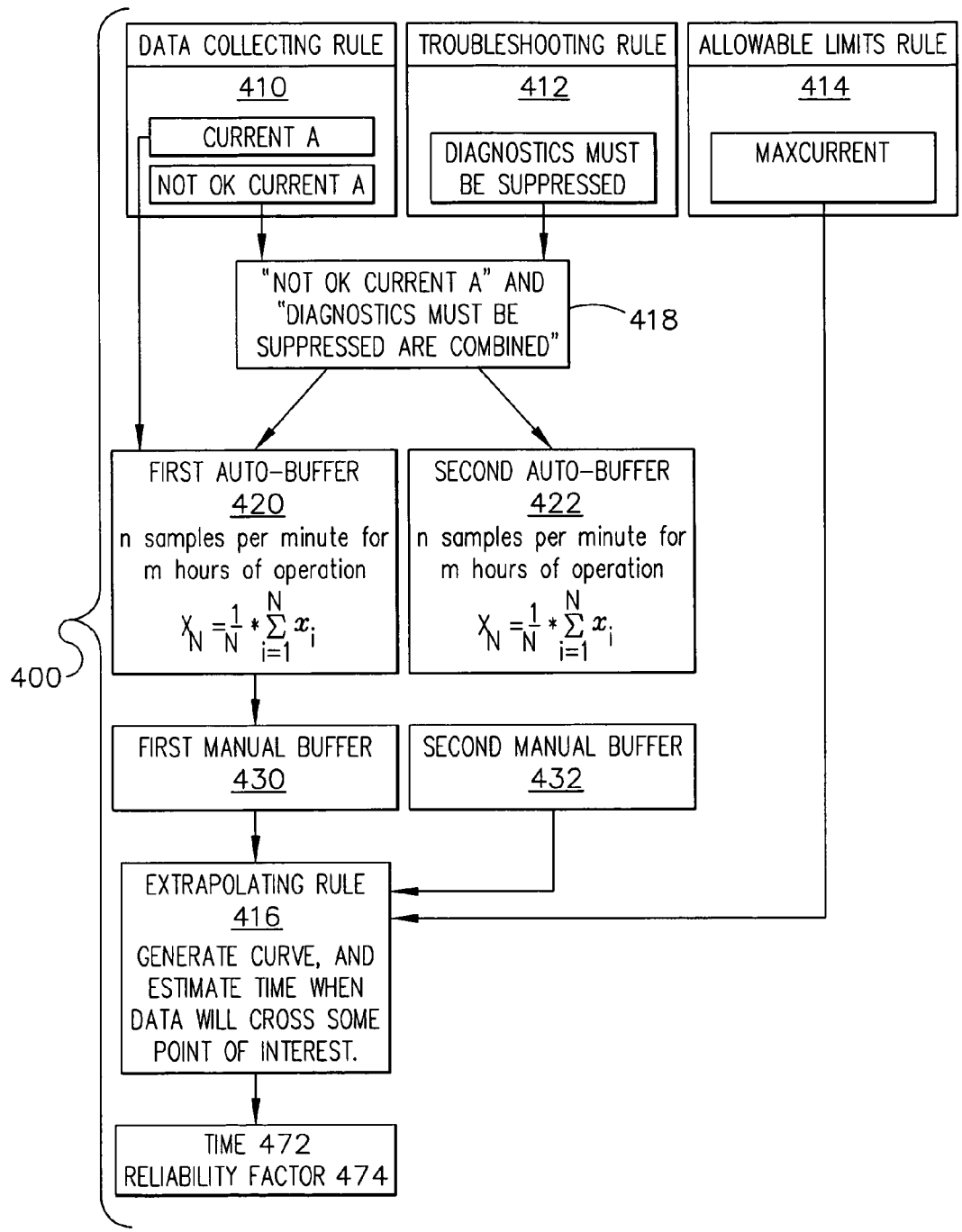
FIG. 4 is an exemplary rule to predict an equipment failure.

FIG. 4 is an exemplary rule set 400 that is configured to receive data from a component and analyze the received data to mathematically predict if and/or when the measured data might cross any warning or alarming level in the furniture, thus eliminating any guesswork from the operator.

In the exemplary embodiment, rule set 400 includes a plurality of rules that are responsive to rule set 400. More specifically, and in the exemplary embodiment, rule set 400 includes at least a data collecting rule 410, a trouble shooting rule 412, an allowable limits rule 414, and a data extrapolation rule 416. In the exemplary embodiment, extrapolation rule 416 receives a plurality of variables that are derived, collected and/or stored within other rules, such as, but not limited to, data collecting rule 410, troubleshooting rule 412, and allowable limits rule 414, for example.

During operation, a plurality of data samples generated by data collecting rule 410 are utilized by rule 400 to facilitate predicting if and/or when a component may fail. Although the methods and systems described herein are in relation to extrapolating a failure of an electric motor utilizing a current signal received from the electric motor, it should be realized that rule set 400 is utilized to mathematically predict if and/or when the measured data received from any component might cross any warning or alarming level in the future. Therefore, the electric motor current is utilized herein to describe an exemplary embodiment, and thus not to limit the scope of rule set 400.

Accordingly, rule set 400 includes programming language to organize a first auto-buffer 420 and a second auto-buffer 422. During operation, first auto-buffer 420 collects and/or receives "Current A" data samples from data collecting rule 410. Specifically, first auto-buffer 420 samples the electric current n times per minute over m hours. Li the exemplary embodiment, n=1, and m=60. Therefore, and in the exemplary embodiment, the electric motor current data is sampled once per minute for sixty minutes to generate sixty samples per hour of electric motor current data which are then stored in first auto-buffer 420. The sixty samples of electric motor current data are then averaged together to generate an average motor current data result, i.e. a single data point 424 that is indicative of the average motor current over the proceeding hour of data collection. The average motor data point 424 is then passed to a first manual buffer 430. In the exemplary embodiment, a single averaged data point 424 from first auto-buffer 420 is communicated to first manual buffer 430 each hour. Moreover, and in the exemplary embodiment, first manual buffer 430 is programmed to store eight data points 424 that are received from first auto-buffer 420, wherein each data point 424 represents a single hour of electric current data. First manual buffer therefore stores eight numbers representing mean values for "Current A" for eight consecutive hours in the exemplary embodiment.

In the exemplary embodiment, second auto-buffer 422 samples the binary data n times per minute over m hours. In the exemplary embodiment, n=1, and m=60, accordingly, and in the exemplary embodiment, the binary data is sampled once per minute for sixty minutes to generate sixty samples of binary data which are stored in second auto-buffer 422. The sixty samples of binary data are then averaged to together to generate an average binary data result, i.e. all the 0's and 1's are added together and divided by the total number of binary data points to generate a single binary data point that is indicative of the average of the binary data over the proceeding hour of data collection.

Second auto-buffer 422 collects and/or receives binary data, i.e. 0's and 1's from troubleshooting rule 412. More specifically, troubleshooting rule 412 is configured to monitor the data samples generated by data collecting rule 410. In the exemplary embodiment, if the data samples generated by data collecting rule 410 are acceptable, troubleshooting rule 412 generates a "1" indication which is communicated to second auto-buffer 422. Alternatively, if the data samples generated by data collecting rule 410 are not acceptable troubleshooting rule 412 generates a "0" indication, also referred to as a "Not OK Current A" indication, which is communicated with second auto-buffer 422. Specifically, second auto-buffer 422 is configured to verify that the data samples generated by data collecting rule 410 meet a predetermined threshold, prior to transmitting the samples to first auto-buffer 420. More specifically, if the sampled data is within a predefined range, troubleshooting rule 412 generates a "1" indication that is transmitted to second auto-buffer 422. If however, the sampled data is outside the predefined current range, troubleshooting rule 412 generates a "0" indication that is transmitted to second auto-buffer 422. For example, when the motor is started and/or stopped, the data samples generated by data collecting rule 410 may be greater and/or less than the predefined range, such that troubleshooting rule 412 determines that the data is not reliable.

In the exemplary embodiment, Boolean "Not Ok Current A" and Boolean "Diagnostics must be suppressed" are combined together in a rule 418 to produce a Boolean variable with a general notion "Something is not right", which operates both auto-buffers 420 and 422, respectively. During operation, if the "Something is not right" variable is true, i.e. the average of the data collected by second auto-buffer 422 is "0", then first auto-buffer 420 collecting Current A samples is re-set to zero. More specifically, if the variable "Something is not right" is true, i.e. at least one sample (n) in second auto-buffer 422 is zero, thus the average value of all the binary samples within second auto-buffer 422 is less than one, then the sampled data is not communicated to first auto-buffer 420. For example, if eight consecutive average values, stored in second manual buffer 432, are summed together, the result will not give the number eight as a sum if the "Something is not right" variable is true for at least one sample. Therefore, the prediction will be suppressed as based upon unreliable data.

Alternatively, if eight consecutive average values 424, stored in second manual buffer 432, are summed together, and the result is one, i.e. the "Something is not right" variable is false for all samples, then the results from first manual buffer 430 are communicated to extrapolation rule 416 to mathematically and/or visually predict if and/or when the measured data, i.e. electric current, might cross any warning or alarming level in the future.

In the exemplary embodiment, the data collected in first manual buffer 430 is utilized by extrapolation rule 416 to generate a graphical illustration of the electric motor current that is based on previous data collected from the electric motor, and to calculate when the electric motor current might cross any warning or alarming level in the future.

Figure 5:
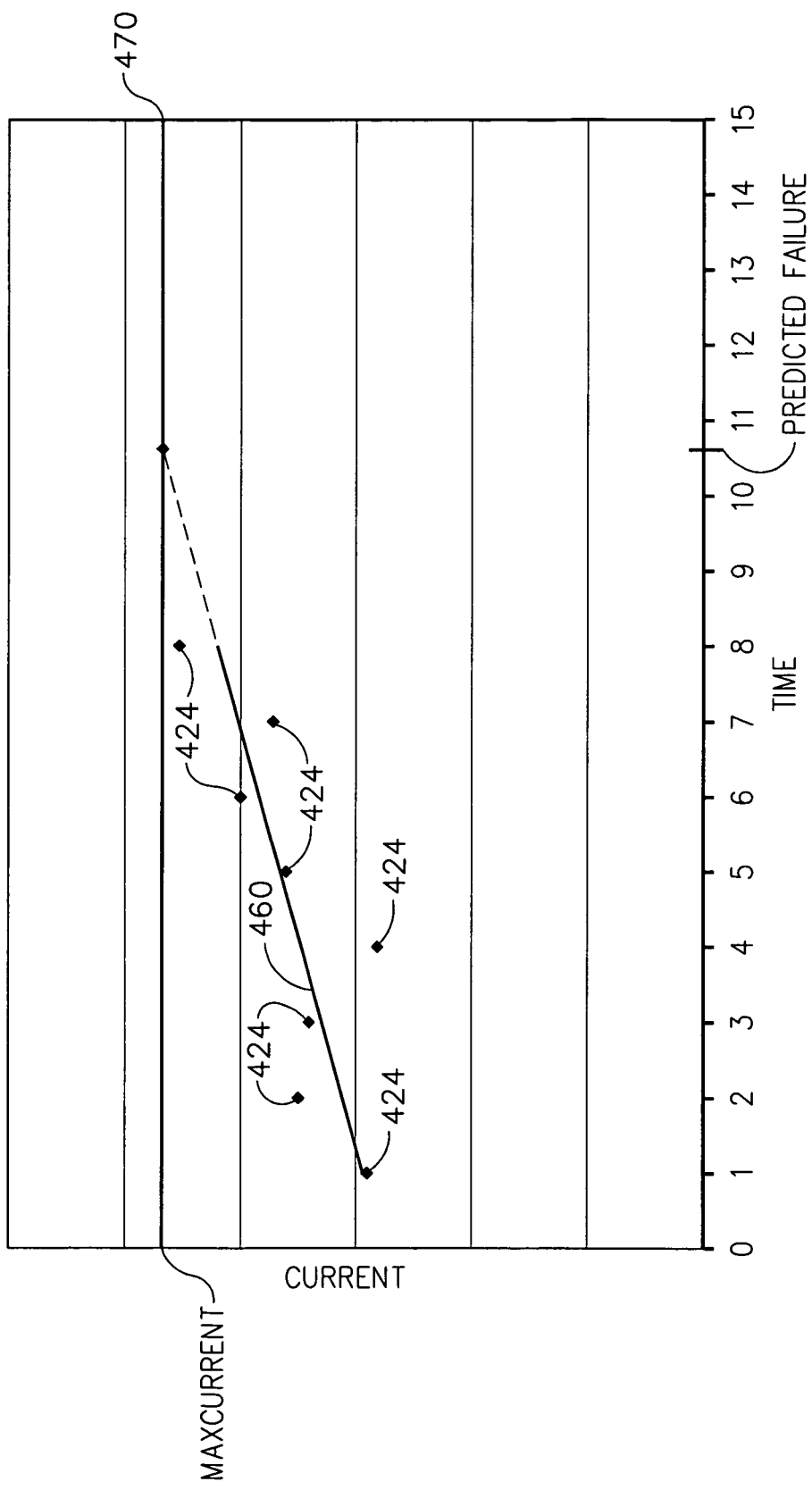
FIG. 5 is a graphical illustration of the results obtained using the rule shown in FIG. 4.

FIG. 5 is a graphical illustration of a curve generated by extrapolation rule 416. In the exemplary embodiment, data points 424 received from first manual buffer 430 are plotted on a graph. More specifically, the eight data points 424 communicated from first manual buffer 430 are utilized by extrapolation rule 416 to generate a curve 460. In the exemplary embodiment, data points 424 are utilized to generate a polynomial curve, such as a straight line "best fit" curve, for example as shown in FIG. 5. In another embodiment, data points 424 are utilized to generate an exponential curve. In another embodiment, data points 424 are utilized to generate a Weibull curve.

After extrapolation rule 416 has generated curve 460, extrapolation rule 416 also generates a "time" 472 when curve 460 will cross a predetermined threshold 470 that represents a relatively dangerous operational level, i.e. when the component is likely to experience a failure. In one embodiment, time 472 is represented as a quantity of hours until the motor will reach a predicted failure. In another embodiment, time 472 is represented as a date on which the motor will reach the predicted failure. More specifically, and in the exemplary embodiment, predetermined threshold 470 is communicated from allowable limits rule 414 to extrapolating rule 416. In the exemplary embodiment, predetermined threshold 470 is the "MaxCurrent" variable stored in allowable limits rule 414, i.e., the maximum current at which the motor may operate without experiencing a failure. Accordingly, in the exemplary embodiment, extrapolation rule 416 predicts when the motor current will meet and/or exceed the maximum motor current allowable, MaxCurrent, and generates a result, viewable by an operator that indicates this time 472.

In the exemplary embodiment, time 472 is mathematically determined in accordance with the following equations:

$$\text{Time} = \frac{MaxCurrent - b}{a}$$

$$a = \frac{1}{336} * \left[ 8(0 * y_1 - 1 * y_2 - 2 * y_3 - 3 * y_4 - 4 * y_5 - 5 * y_6 - 6 * y_7 - 7 * y_8) + 28 \sum_{i=1}^{8} y_i \right]$$

$$b = \frac{1}{336} * \left[ 8(0 * y_1 - 1 * y_2 - 2 * y_3 - 3 * y_4 - 4 * y_5 - 5 * y_6 - 6 * y_7 - 7 * y_8) + 140 \sum_{i=1}^{8} y_i \right]$$

where $y_i \ldots y_8$ represent values obtained from first manual buffer 430, i.e. data points 424 that are collected for eight consecutive hours as shown in the "best fit" curve in FIG. 5.

In the exemplary embodiment, extrapolation rule 416 also generates a reliability factor 474. In one embodiment, if reliability factor 474 is equal to one, then time 472 is accurate. Alternatively, if reliability factor 474 is equal to zero, then time 472 is not accurate and should be discarded. More specifically, the Boolean operator "Not OK Current A" and the Boolean operator "Something is Not Right" variables are combined in rule 418. Accordingly, if the output of rule 418 is a "1" then extrapolating rule 416 provides an operator with an indication that the data is reliable, and therefore the estimate until failure is also reliable. However, if the output of rule 418 is a "0" then extrapolating rule 416 provides an operator with an indication that the data is not reliable, and therefore the estimate until failure is also not reliable. Accordingly, rule 400 also includes a method to verify that the estimated time until failure of the component is verified to ensure that the estimate is accurate.

A technical effect of the present invention is to provide a rule based computer program that is configured to predict the remaining operational life of a component. Specifically, data from the equipment being monitored, is not only displayed, but also mathematically analyzed. The analysis makes a prediction regarding when the measured data might cross any warning or alarming level in the future, thus eliminating any guesswork from operator. More specifically, the trending data is mathematically processed for the purpose of extrapolation of the trend to the future. Then, any possibility that extrapolated data crosses some dangerous level, is checked, and the time of checking is reported. Further, the rules described herein provide a future time when the equipment may fail by trending the data to visually and mathematically determine when the trended data will reach an alarm level. The rules also suppress any data that is either to far in the past or too far away in the future, and suppress any bad samples within the data.

While the present invention is described with reference to an industrial plant, numerous other applications are contemplated. It is contemplated that the present invention may be applied to any control system, including facilities, such as commercial facilities, vehicles, for example ships, aircraft, and trains, and office buildings or a campus of buildings, as well as, refineries and midstream liquids facilities, and facilities that produce discrete product outputs, such as, factories.

The above-described systems and methods of predicting an equipment failure is cost-effective and highly reliable for monitoring and managing the operation and maintenance of facilities. More specifically, the methods and systems described herein facilitate determining facility machine health. As a result, the methods and systems described herein facilitate reducing plant operating costs in a cost-effective and reliable manner.

Exemplary embodiments of monitoring systems and methods are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method of predicting the remaining operational life of a component, said method comprising:
   generating a plurality of component data samples utilizing a machinery monitoring system including a database having at least one rule set, the component data samples indicative of at least one operational parameter of the component;
   communicating the component data samples to a first auto-buffer;
   trending the component data samples utilizing the rule set;
   utilizing a data collecting rule to generate the component data samples;
   extrapolating the trended data to facilitate predicting the remaining operational life of the component; and
   outputting the remaining operational life of the component.

2. A method in accordance with claim 1 further comprising generating a time when the extrapolated data will exceed a predetermined threshold.

3. A method in accordance with claim 2 wherein generating a time when the extrapolated data will exceed a predetermined threshold further comprises generating a time in accordance with:

$$\text{Time} = \frac{MaxCurrent - b}{a}$$

$$a = \frac{1}{336} * \left[ 8(0*y_1 - 1*y_2 - 2*y_3 - 3*y_4 - 4*y_5 - 5*y_6 - 6*y_7 - 7*y_8) + 28\sum_{i=1}^{8} y_i \right]$$

$$b = \frac{1}{336} * \left[ 8(0*y_1 - 1*y_2 - 2*y_3 - 3*y_4 - 4*y_5 - 5*y_6 - 6*y_7 - 7*y_8) + 140\sum_{i=1}^{8} y_i \right]$$

where $y_i \ldots y_8$ represent values obtained from data points.

4. A method in accordance with claim 1 further comprising:
   utilizing the first auto-buffer to generate a plurality of data points; and
   communicating the plurality of data points to a first manual buffer.

5. A method in accordance with claim 4 wherein utilizing the first auto-buffer to generate a plurality of data points further comprises:
   determining an average of the first data points utilizing the first auto-buffer; and
   communicating the average to the first manual buffer; and
   utilizing the average within the first manual buffer to generate a graph illustrating the prediction.

6. A method in accordance with claim 4 further comprising:
   verifying that the data samples are within a predefined range;
   deleting the data samples if the data samples are not within the predefined range; and
   generating an indication that the prediction is not accurate if at least one of the data samples is not within the predefined range.

7. A method in accordance with claim 6 further comprising generating an indication that the prediction is invalid after a predetermined length of time.

8. A method in accordance with claim 1 further comprising:
   collecting a data sample every minute utilizing a first auto-buffer;
   averaging sixty data samples to generate a single data point utilizing the first auto-buffer; and
   extrapolating at least eight data points; and
   buffering the eight data points to facilitate generating a relatively smooth graphical illustration predicting the remaining operational life of the component.

9. A method in accordance with claim 8 further comprising extrapolating the eight data points using a least squares fit method to facilitate generating a curve representative of the extrapolate data points.

10. A method in accordance with claim 9 further comprising generating at least one of a polynomial curve, a exponential curve, and a Weibull curve using the eight data points.

11. A computer program encoded on a computer readable medium for predicting the remaining operational life of a component, said computer program configured to:
    generate a plurality of component data samples utilizing a machinery monitoring system including a database having at least one rule set, the component data samples indicative of at least one operational parameter of the component;
    communicate the component data samples to a first auto-buffer;
    trend the component data samples utilizing the rule set;
    utilize a data collecting rule to generate the component data samples;
    utilize the first auto-buffer to generate a plurality of data points;
    communicate the plurality of data points to a first manual buffer;
    extrapolate the trended data to facilitate predicting the remaining operational life of the component; and
    output the remaining operational life of the component.

12. A computer program in accordance with claim 11 further configured to generate a time when the extrapolated data will exceed a predetermined threshold.

13. A computer program in accordance with claim 12 further configured to generate a time when the extrapolated data will exceed a predetermined threshold in accordance with:

$$\text{Time} = \frac{MaxCurrent - b}{a}$$

$$a = \frac{1}{336} * \left[ 8(0*y_1 - 1*y_2 - 2*y_3 - 3*y_4 - 4*y_5 - 5*y_6 - 6*y_7 - 7*y_8) + 28\sum_{i=1}^{8} y_i \right]$$

$$b = \frac{1}{336} * \left[ 8(0*y_1 - 1*y_2 - 2*y_3 - 3*y_4 - 4*y_5 - 5*y_6 - 6*y_7 - 7*y_8) + 140\sum_{i=1}^{8} y_i \right]$$

where $y_i \ldots y_8$ represent values obtained from data points.

14. A computer program in accordance with claim 11 further configured to:
  determine an average of the first data points utilizing the first auto-buffer; and
  communicate the average to the first manual buffer; and
  utilize the average within the first manual buffer to generate a graph illustrating the prediction.

15. A computer program in accordance with claim 11 further configured to:
  verify that the data samples are within a predefined range;
  delete the data samples if the data samples are not within the predefined range; and
  generate an indication that the prediction is not accurate if at least one of the data samples is not within the predefined range.

16. A computer program in accordance with claim 15 further configured to generate an indication that the prediction is invalid after a predetermined length of time.

17. A computer program in accordance with claim 11 further configured to:
  collect a data sample every minute utilizing a first auto-buffer;
  average sixty data samples to generate a single data point utilizing the first auto-buffer; and
  extrapolate at least eight data points; and
  buffer the eight data points to facilitate generating a relatively smooth graphical illustration predicting the remaining operational life of the component.

18. A computer program in accordance with claim 17 further configured to extrapolate the eight data points using a least squares fit method to facilitate generating a curve representative of the extrapolate data points.

19. A computer program in accordance with claim 18 further configured to generate at least one of a polynomial curve, a exponential curve, and a Weibull curve using the eight data points.

* * * * *